United States Patent [19]

Brundage

[11] Patent Number: 4,553,735
[45] Date of Patent: Nov. 19, 1985

[54] SOLENOID CONTROLLED VALVE

[76] Inventor: Robert W. Brundage, 135 Paradise Rd., Painesville, Ohio 44077

[21] Appl. No.: 339,092

[22] Filed: Jan. 13, 1982

[51] Int. Cl.$^4$ .................. F16K 31/06; F16K 25/00
[52] U.S. Cl. .................. 251/129.16; 251/282; 137/454.5; 335/297
[58] Field of Search ............ 251/129, 141, 282, 139; 335/299, 250, 297

[56] References Cited

U.S. PATENT DOCUMENTS

| | | |
|---|---|---|
| 1,548,232 | 8/1925 | Westbrook . |
| 1,623,431 | 4/1927 | McVoy . |
| 2,574,762 | 11/1951 | Schell .................. 251/141 X |
| 2,615,466 | 10/1952 | Garde . |
| 2,649,688 | 8/1953 | Slomer . |
| 2,650,609 | 9/1953 | Herbst . |
| 2,668,556 | 2/1954 | Meyer . |
| 2,788,800 | 4/1957 | Towler . |
| 2,813,519 | 11/1957 | Persson . |
| 2,898,936 | 8/1959 | Collins . |
| 2,930,360 | 3/1960 | Yando . |
| 2,944,564 | 7/1960 | Pettey . |
| 2,959,156 | 11/1960 | Dreptin . |
| 2,977,984 | 4/1961 | Slomer . |
| 3,017,897 | 1/1962 | Seguenot . |
| 3,019,375 | 1/1962 | Geyer et al. .................. 335/297 |
| 3,131,608 | 5/1964 | Yando . |
| 3,279,743 | 10/1966 | De la Garza . |
| 3,588,039 | 6/1971 | Chelminski .................. 251/141 |
| 3,598,360 | 8/1971 | Merriner .................. 251/129 |
| 3,613,717 | 10/1971 | Smith . |
| 3,670,768 | 6/1972 | Griswold .................. 251/141 X |
| 3,709,257 | 1/1973 | Faisandier . |
| 3,743,240 | 7/1973 | Merriner et al. .................. 251/141 X |
| 3,791,408 | 2/1974 | Saitou et al. . |
| 3,800,663 | 2/1974 | Clark . |
| 3,800,832 | 4/1974 | Umphenour et al. .......... 251/282 X |
| 3,842,857 | 10/1974 | McCormack . |
| 3,902,402 | 9/1975 | Walters . |
| 3,945,399 | 3/1976 | Tirelli . |
| 4,074,699 | 2/1978 | Stampfli . |
| 4,074,700 | 2/1978 | Engle .................. 251/282 X |
| 4,106,522 | 8/1978 | Manesse . |
| 4,150,695 | 4/1979 | Kosugui . |
| 4,339,109 | 7/1982 | Kawata et al. .................. 251/141 X |

FOREIGN PATENT DOCUMENTS

| | | |
|---|---|---|
| 1048601 | 8/1953 | France . |
| 616361 | 2/1961 | Italy . |
| 860665 | 2/1961 | United Kingdom . |

OTHER PUBLICATIONS

American Barmag, Charlotte, N. Carolina–Electrically Control Directional Flow Valve.
Fluid Controls, Inc., Mentor, OH–Solenoid Cartridge Valve, 1977 catalog, pp. 20.01 to 21.02.
3 pages–Fluid Pressure Mechanisms by H. G. Conway (2nd Div.), pp. 191, 195 & 196.

Primary Examiner—Arnold Rosenthal
Attorney, Agent, or Firm—Body, Vickers & Daniels

[57] ABSTRACT

A solenoid operated, direct acting, poppet style two-way valve wherein the fluid pressures on the valve member are completely balanced, a low power electrical signal is required to control its opening and the design features are such as to permit a valve of minimum size and which can be manufactured at a minimum cost. The valve housing and valve member are each manufactured from tubing, each with one end formed radially inwardly by a spinning process to provide a valve seat and valve seat engaging surface respectively. The valve member has a through passage and the end remote from the valve seat engaging end slides on a fixed piston having a cross-sectional area equal to the area of the valve seat such that the valve member is in complete axial pressure balance. The valve member includes a support member and an elongated flexible stem extending therefrom on the free end of which the valve seat engaging surface is located whereby the valve seat can be self-aligning with its valve seat.

5 Claims, 2 Drawing Figures

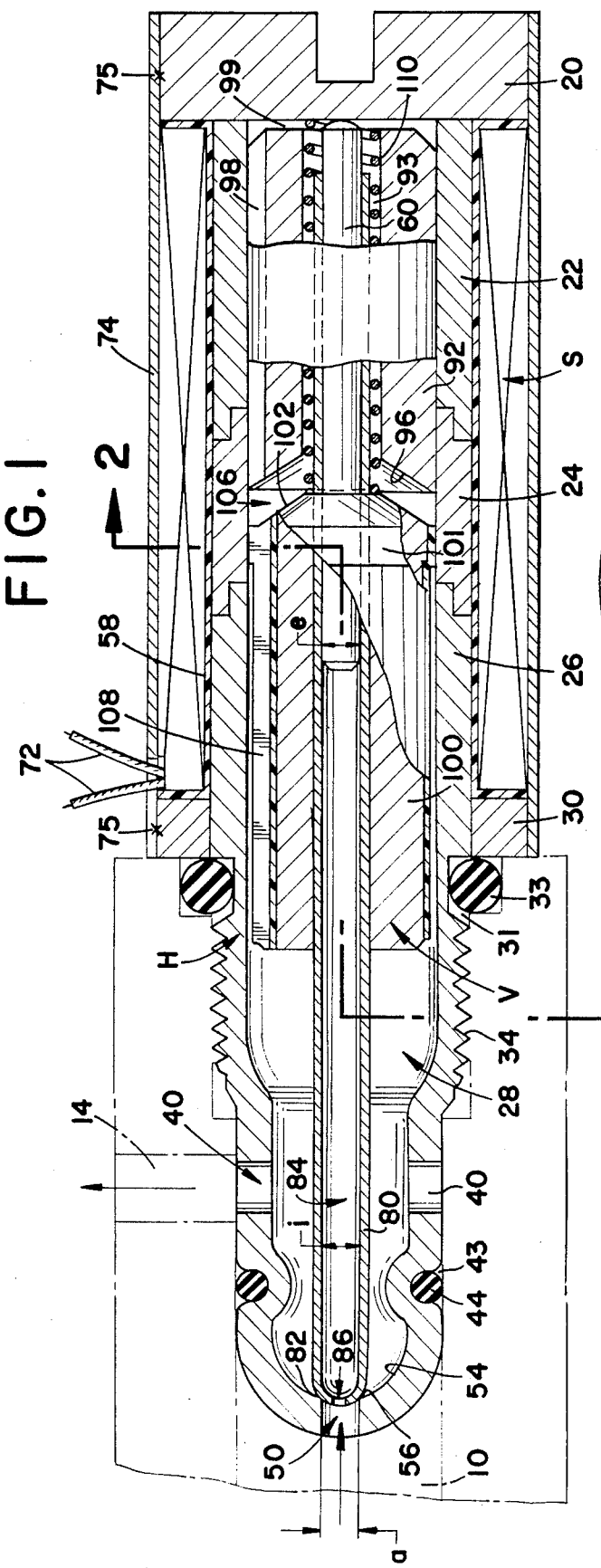

SOLENOID CONTROLLED VALVE

This invention pertains to the art of fluid pressure valves and more particularly to an electrically controlled solenoid type fluid pressure valve.

The invention is particularly applicable to the control of high hydraulic pressures, e.g. 3,000 psi and will be described with particular reference thereto although it will be appreciated that the invention is also useable with gases of various kinds under pressure.

The invention is also particularly applicable to pilot valves wherein small volumes of high pressure hydraulic fluid are allowed to flow to actuate larger fluid pressure or fluid flow controlling valves and will be described with particular reference thereto although it will be appreciated that many of the unique features to be described can be used in any type of fluid valve (hydraulic or gas) including without limitation: poppet valves; relief valves; two position, three-way valves; and/or, three position, four-way valves, all of any flow capacity and either with or without solenoid control.

The invention is in some respects related to the inventions described in my co-pending patent applications, Ser. No. 189,913 filed Oct. 2, 1980, and Ser. No. 205,214 filed Nov. 12, 1980, and the disclosures of such specifications are hereby incorporated into this specification by reference.

BACKGROUND

Electrically controlled, i.e. solenoid, poppet valves are used extensively for remotely controlling large hydraulically controlled valves or actuators which will in turn control hydraulic motors, pumps or pistons or for relieving or maintaining a pre-set pressure or flow in a hydraulic system.

Such valves generally include cylindrical valve members movable on an axis in a valve cavity, the high pressure inlet port being through a side of the cavity and the outlet port being through an end of the cavity. High pressure in the cavity biases the valve member to the valve closed position with a force proportional to the area of the valve seat surrounding the outlet port. A solenoid coil surrounding the housing exerts a magnetic force on a magnetically permeable armature inside the cavity to move the valve member against the pressure bias to open the outlet port. Alternatively, a spring biases the valve member to an open position and the magnetic force moves the valve member against the spring bias to close the valve.

Such valves typically have a flow rate of from approximately one-fifth to five gallons per minute at 3,000 pounds psi pressure with a 50 pound psi pressure drop and have external dimensions in excess of 3.0 inches long and 1.0 inches in diameter.

One problem with such valves, which the present invention brings out, is the amount of axial magnetic force which must be developed in order to open the valve against the pressure forces and the inefficient magnetic circuitry used to produce this force. Further high forces are required to move the armature against the mechanical friction developed between the armature and its housing caused by unbalanced magnetic radial forces on the armature. As the magnetic forces are increased to overcome the pressure forces, the friction forces opposing such movement increase in direct ratio to the axial magnetic forces. The large internal forces which must overcome require a solenoid coil and an armature of substantial size, making the design of a miniature poppet valve extremely difficult. The inefficient magnetic circuit requires a higher than necessary number of ampere turns on the solenoid to produce the required force.

All of this either taken alone or in summation requires relatively high electrical power to energize the solenoid, making it somewhat difficult to operate the valve under control of computers or other sophisticated electrical control apparatus. Also, the physical size of the coil is increased with no benefits in end results.

A further problem with such valves, which the present invention brings out, is that the design requires that the housing and the valve member and the armature all be machined from larger pieces of metal with the valve and sealing surfaces honed to accurate dimension, an expensive manufacturing process and resulting in a further increase of bulk in the ultimate valve.

DEFINITIONS

"Tubing" as used herein means a cylindrical tube of metal formed to its ultimate diameters and wall thicknesses by drawing through a cylindrical die opening usually with a sizing plug inside of the tube, such tubing being distinguishable from a tube or sleeve produced by machining, e.g. from a solid metal rod. Tubing as defined herein is characterized by accurate uniform dimensions throughout its length, a smooth inner and outer surface and a high hardness coming as a result of the cold working of the metal during the drawing operation. Hypodermic tubing is a special form of such tubing usually made from stainless steel and ordinarily used to make hypodermic needles by simply cutting the needles to the proper length and sharpening the ends by a grinding process. While tubing as used herein is a commercially available, staple article of commerce, it is believed that the use of tubing in the valve to be described hereinafter is novel and an important discovery to the economical production of an improved performance, small solenoid type fluid valve.

"Forming" as used herein means the shaping of metal tubing to its ultimate shape by known means, e.g. by spinning, swaging or rolling, which does not involve the removal, cutting or shearing of the metal by a cutting tool. While the forming of metal by spinning or swaging is well-known, it is believed that the use of such processes on tubing to produce parts for fluid valves is a novel and unique discovery which enables the economical production of valves with superior performance.

"Fastened" as used herein means the fastening together of two metallic members into a single unitary unit by any known means such as brazing, adhesives, interference fits, welding, either friction or resistance by excluding a threaded engagement.

"Drilling" as used herein means the creation of a round hold or opening in metal by any known means, e.g. drilling with a conventional twist drill, reaming, electrical erosion, honing or the like.

THE INVENTION

The present invention contemplates a new and improved poppet style, two-way valve which overcomes all of the above-referred to difficulties and others, requires a minimum size solenoid coil and uses a combination of stock materials and manufacturing techniques which result in maximum economy of manufacture and compactness in the ultimate valve.

In accordance with the present invention, a fluid pressure valve of the type described is provided comprised of: a housing having an elongated cylindrical cavity; a high pressure inlet port surrounded by a valve seat at one end of the cavity; an outlet port spaced from the inlet port through a side of the cavity; a valve member movable in the cavity having a valve seat engaging surface on one end and a longitudinal passage extending from inside the valve seat engaging surface to the opposite end; and, a fixed piston engaging the end of the cavity remote from the inlet port and extending into the passage, the cross-sectional area of the fixed piston and of the valve seat being substantially equal.

This arrangement results in the valve member, when in the closed position, being in a fully pressure balanced relationship such that a minimum number of ampere turns and thus a minimum size solenoid coil is required to produce the force necessary to open the valve.

Further in accordance with the invention, the valve member includes a magnetic armature and a solenoid surrounding the portion of the cavity where the armature is located for exerting an axial magnetic force on the valve member to open the valve.

Further in accordance with the invention, a portion of the housing inside of the solenoid is a magnetically non permeable sleeve having its end adjacent the advancing end of the armature rabbetted on the outside and its other end on the inside. Such an arrangement is different from existing constructions where both ends are rabbetted on the inside and gives a higher axial magnetic force for a given number of ampere turns.

Further in accordance with the invention, the solenoid is between radial flanges of magnetically permeable material and the solenoid housing includes a cylindrical split-sleeve of springy magnetically permeable material having an unflexed diameter less than the diameter of the flanges and a length to overlap same. Such a housing is economical to fabricate, is easily assembled over the flanges by springing it open and provides a good magnetic circuit.

Further in accordance with the invention, the sides of the flanges and the outside of the armature housing are coated with a hardened layer of insulating material and the solenoid wire is wound directly thereon. The cost and bulk of a bobbin are thus eliminated.

Further in accordance with the invention, the valve member includes a portion slidable in the housing and an unsupported elongated flexible stem extending therefrom with an angled valve seat engaging surface on the free end whereby this end is radially movable and the surface can be self-aligning with its valve seat.

Further in accordance with the invention and in a fluid valve, the valve housing is made from "tubing" with one end "formed" to a lesser diameter and drilled to provide a port and valve seat of a controlled diameter.

Further in accordance with the invention, the valve housing is made from "tubing" with an end formed into a spherical shape and with threads "formed" in said tubing adjacent to said such end.

Further in accordance with the invention, the housing includes an elongated sleeve having an end plate "fastened" thereto. With this arrangement, the housing cavity is closed without the use of screw threads and/or O ring seals both of which add to the cost of manufacture and valve size.

Further in accordance with the invention, the valve member is made from "tubing" with one end "formed" to a tapering or spherical portion of lesser diameter than the inside of the tube to provide a valve seat engaging surface.

Still further in accordance with the invention, the valve member includes a length of "tubing" with one end "formed" to a portion of lesser diameter than the inside of the tube and a magnetically permeable sleeve is fastened to the outside of the tubing at a point spaced from the formed end.

Further in accordance with the invention, the magnetic armature has an external coating of non magnetic material preferably "Teflon" whereby to limit the minimum radial air gap and thus the radial magnetic force to limit friction.

Further in accordance with the invention, the armature tapers slightly from one end to the other and the one end has a slightly reduced diameter whereby the armature can rock slightly about the cavity axis assisting in the valve seat surfaces being self-aligning.

It is believed that each of the above features is, in and of itself, unique in fluid pressure valves and each contributes individually and in combination to a valve which is superior in performance, has a minimum size for a given fluid flow and can be manufactured very economically.

OBJECTS

The principal object of the invention is the provision of a new and improved fluid pressure valve wherein the valve member is in complete pressure balanced relationship on its axis of movement and can be moved from the closed to the open position with a minimum linear force.

Another object of the invention is the provision of a new and improved electrically operated valve which can be economically manufactured which is simple in construction and dependable in operation.

Another object of the invention is the provision of a new and improved valve for controlling flow of relatively high fluid pressures which is small in size and yet is dependable in operation.

Another object of the invention is the provision of a new and improved solenoid operated direct acting poppet valve which requires a minimum amount of electric power to effect opening of the valve.

Another object of the invention is the provision of a new and improved high pressure valve which can be made to dimensions smaller than ever heretofore known for a given fluid capacity.

Another object of the invention is the provision of a new and improved solenoid operated direct-acting poppet valve requiring a minimum number of ampere turns in the solenoid.

Another object of the invention is the provision of a new and improved valve wherein the valve seat engaging surface on the valve member is self-aligning with the valve seat surrounding the inlet port.

Still another object of the invention is the provision of a new and improved electrical valve operating system wherein unbalanced radial magnetic forces on an armature associated with the valve member are limited to an amount such that friction between the armature and the walls of the cavity are not sufficient to prevent free movement of the armature and the valve member within the cavity.

Another object of the invention is the provision of a new and improved fluid valve wherein the housing can be economically formed from a length of tubing.

Another object of the invention is the provision of a fluid valve including a valve member economically formed from hypodermic tubing.

Another object of the invention is the provision of a new and improved housing for a fluid valve which can be economically manufactured by providing a plurality of lengths of tubing fastened in end to end relationship with one end of the tube closed by a cap fastened to the end of the tube and the other end of the tube having a valve seat provided on a portion of the tube formed to a diameter less than the inner diameter of the tube.

Another object of the invention is a housing for fluid valves wherein all of the parts are fastened together by brazing friction or resistance welding.

Another object of the invention is a fluid valve wherein the housing does not have any threaded joints or O-ring seals.

Still another object of the invention is the provision of a new and improved fluid valve construction which can be economically manufactured by virtue of having a minimum number of machined parts and employs formed tubing for a maximum economy of manufacture.

Another object of the invention is the provision of a new and improved housing for solenoid controlled valves which provides improved magnetic performance and requires a minimum number of ampere turns.

Another object of the invention is the provision of a new and improved solenoid valve design requiring a lesser number of ampere turns to actuate it.

Another object of the invention is the provision of a solenoid actuated fluid valve having a housing for the solenoid which is easily and economically manufactured, easily and economically assembled and which provides a good magnetic circuit for the solenoid.

Other objects and beneficial results of the invention will become apparent from the following description of the preferred embodiment.

DRAWINGS

The invention may take physical form in certain parts and arrangement of parts, a preferred embodiment of which will be described in detail in this specification and illustrated in the accompanying drawing which forms a part hereof and wherein:

FIG. 1 is a side cross-sectional view greatly enlarged and with portions in elevation, of a solenoid operated direct acting poppet valve assembled with a valve block illustrating a preferred embodiment of the present invention; and FIG. 2 is a cross-sectional view of FIG. 1 taken approximately on the line 2—2 thereof.

PREFERRED EMBODIMENTS

Referring now to the drawings, wherein the drawings are for the purpose of illustrating a preferred embodiment of the invention only, and not for the purposes of limiting same, the figures show a valve body A with a cartridge valve of the invention assembled therewith, such valve including: a housing H having an elongated cylindrical cavity therein; an electrical solenoid coil S surrounding one end of the housing H and a valve member V within the cavity movable from the closed position shown to an open position when the solenoid coil S is electrically energized.

The valve body A is conventional in construction, forms no part of the present invention and is shown simply for the purposes of illustrating the environment of the valve. The valve body A has a cylindrical opening therein communicating at the base with an inlet high pressure passage 10 and threaded adjacent the opening to receive the valve. The body A also includes an outlet low pressure passage 14 which communicates with any other apparatus to be actuated by the hydraulic pressures in the inlet passage 10.

The housing H of the valve B is comprised of a number of members fastened in fluid tight relationship which reading from right to left, include an end plate 20 of magnetically permeable material, a first sleeve 22 of magnetically permeable material, a second sleeve 24 of magnetically non-permeable material and a third elongated sleeve 26 of magnetically permeable material all fastened together.

The end plate 20 may be fastened in pressure tight relationship to the right end of sleeve 22 by any one of a number of different means but in the embodiment shown, and in accordance with the invention, by welding either resistance or friction. No threads or O-ring seals are required. The right end of plate 20 has a screw driver receiving slot 21.

The adjacent end of the sleeves 22, 24, 26 are rabbetted on the inside and outside with the rabbets being inter-nested and fastened, preferably by brazing, into a rigid aligned relationship. These sleeves form an elongated cavity 28 closed at the right end by end plate 20. While the sleeves 22, 24 and/or 26 can be machined from ordinary metal bar stock, in accordance with the invention, they are preferably short lengths of tubing (as defined hereinabove) cut from longer lengths of tubing and with the ends machined to provide the rabbets shown.

A rabbetted construction of magnetic pressure housings is known. However, in accordance with the invention, the left end (i.e. as will appear hereinafter adjacent the leading end of armature 100) of sleeve 24 is rabbetted on the inside while the right end is rabbetted on the outside. The adjacent ends of sleeves 22 and 24 are rabbetted to mate with the ends of sleeve 24. This construction is believed to be novel and gives improved magnetic characteristics.

The sleeve 26 is relatively elongated and a flange member 30 of magnetically permeable material in the form of a washer stamped from sheet metal is fastened to its outer surface a distance spaced from the end plate 20. The end plate 20 extends radially outwardly beyond sleeve 22 to provide a flange 32 equal in diameter to the flange 30.

To the left of flange 30, the sleeve 26 has a groove 31 formed in its outer surface to receive an O ring 33. To the left of O ring 33, the sleeve has threads 34 preferably generated by forming to mate with the threads of the valve block A. Block A, as shown, abuts against the O ring 33 to provide a fluid tight seal. To the left of the threads 34, the sleeve 26 has a pair of outlet ports 40 drilled therethrough communicating outlet passage 14 with the cavity 28. To the left of the outlet port 40, there is a groove 43 to receive an O ring 44 which seals the inlet passage 10 from the outlet passage 14.

Further in accordance with the invention, the extreme left end of the sleeve 26 is formed radially inwardly to a spherical shape to define an inlet port 50 on the left axial end of the sleeve 26. To exactly control the diameter, the inlet port 50 is drilled on the axis of the cavity 28 to a predetermined diameter a and in so drilling the inlet port 50, the wall 52 of the port and the wall 54 on the inside of the tubing 26 intersect at a sharp corner 56 to provide a sharp cornered valve seat which defines an inlet port of a cross-sectional area determined by the dimension a. For a fluid flow of ¼ to 1/5 gallon per minute (gpm) at a pressure drop of 50 psi dimension a is equal to 0.040 inches. For larger flows, dimension a must be proportionately larger.

Solenoid coil S is positioned between flanges 30 and 32 and surrounds sleeves 22, 24 and the right hand end of the sleeve 26.

After the housing H is assembled as above described, the facing surfaces of flanges 30, 32 and the outside of sleeves 22, 24, 26 therebetween are sprayed or dipped into an insulating material 58, e.g. powdered nylon, a refractory or a liquid and then hardened by drying, baking or fusing.

The solenoid coil is then wound directly onto this insulating material and into the intermediate space. No bobbin is required. It is believed this arrangement is unique in solenoid actuated valves. Electrical leads 72 extend outwardly from the coil S. The coil may be potted as is conventional.

Solenoid housing 74 is of magnetically permeable material and surrounds the solenoid S and overlaps the outer edges of the flanges 30, 32. In accordance with the invention, this housing 74 is formed from a sheet of springy magnetically permeable material, e.g. steel, to a split sleeve having a free unstressed inner diameter less than the diameter of the outer edges of the flanges 30, 32. The housing 74 is sprung open enough to be assembled over the flanges 30, 32 and then allowed to spring back into firm physical contact therewith. It is believed that this construction is novel. The housing 74 is then permanently fixed into position by spot-welding 75 or the like. The housing 74 contains an opening 76 for the leads 72 as is conventional.

The housing 74, flange 30, end plate 30 and sleeves 22, 26 provide a magnetic circuit for solenoid S with a magnetic stir gap at sleeve 24.

Coil S, for a ¼ to 1/5 gpm, has 500 turns of #32 gage copper wire with a resistance of about 13.5 ohms. At 9 volts D.C., it is capable of creating a 4¼ pound axial magnetic force on valve member V.

The valve member V in accordance with the invention includes a magnetic armature 100 slidable in the housing cavity and an elongated tube or stem 80 fastened thereto. Stem 80 is a length of hypodermic tubing, with the left hand end formed radially inwardly to provide a spherical valve seat engaging surface 82 and an inner passage 86 therethrough to communicate the inlet port 50 with the inside 84 of the tube 80.

Hypodermic tubing is commercially available in various dimensions as a staple article of commerce. In the preferred embodiment, the tubing has an outer diameter of 0.0625 inches, a wall thickness of 0.010 inches and an inner diameter i of 0.0425 inches. Surface 82 at 0.040 inches in diameter is at an angle of approximately 45° to the axis and as will appear is self-aligning with valve seat 56.

A steel pin 60 having an outer diameter e just less than diameter i is slidable in the right end of the tube 80. The right end of pin 60 bears against end plate 20 while the left end is exposed to the pressure in passage 84.

The small clearances between pin 60 and the surfaces of passage 84 and the length of the pin are such as to provide a seal having a minimum fluid leakage. O-rings could be provided. In accordance with the invention, dimension a is equal to dimension e. This pin in effect forms a fixed piston with tube 80 being a movable cylinder.

With this arrangement, the valve member C is for all intents and purposes in complete axial pressure force balance. By increasing or decreasing dimension i and e relative to dimension a, the actual axial pressure force bias on valve B can be adjusted at the time of manufacture either decreasing or increasing the closing force respectively.

A magnetically permeable sleeve 92 having an inner passage 93 forms a core for solenoid S and is fastened in the right end of the cavity 28 with its outer surface in close abutting relationship with the inner surface of the sleeve 22. An axial groove 92 communicates the space 99 to the right of tube 80 with with the left end of core 92. The core 92 has a left hand end 96 in the form of a concave cone, that is to say, at an angle to the axis perpendicular for reasons which will appear hereinafter which end overlaps approximately one third the length of sleeve 24. Its length is such that the right end of the core 92 is spaced from cap 20 a small distance. This enables positioning of the core at the time of assembly for the best magnetic characteristics.

Armature 100 is of a magnetically permeable material and has an outer diameter so as to freely slide within the inside of the sleeves 22, 24 and 26. This outer diameter preferably has a slight lengthwise taper from the right end to the left end to permit a slight rocking of the armature relative to the cavity axis. Such a taper is difficult to machine. Accordingly, armature 100 has an end band 101 of a full diameter and an axial width of about 1/16 inch with the left end being reduced in diameter by 0.001 to 0.003 (preferably the former) inches.

Armature 100 has a right end surface 102 generally in the shape of a convex cone and at the same angle as the surface 96. Armature 100 is located on tube 80 so that when the valve is closed, i.e. the solenoid S is unenergized, the surface 102 will be spaced from the surface 96 to provide an air gap 106 such that the magnetic force displacement curve is substantially flat over the range of movement of valve member V. In the preferred embodiment, gap 106 is 0.040 inches. The right end of armature 100 overlaps sleeve 24 approximately one-third of its length. As noted above and importantly, the left end of sleeve 24, that is the end adjacent armature end 102, is rabbetted on the inside to improve the solenoid coil magnetic circuit.

Armature 100 has a longitudinally extending groove 108 communicating air gap 106 and thus space 99 with the housing cavity 28 to the left of the armature 100.

Armature 100 and sleeve 92 are preferably molded from powdered magnetically permeable material.

A helical coil spring 110 is positioned in passage 93 of core 92 and extends from the right end of armature 100 to the left surface of plate 20 and biases the valve member V to the valve closed position when the solenoid S is unenergized. Pressure in the passage 84 biases pin 60 against plate 20.

This spring in the preferred embodiment exerts an axial force on the valve member V of approximately 3.0 pounds.

The magnetic forces on the armature 100 are always unbalanced in a radial direction and always try to pull the armature radially into friction engagement with the inner surface of the housing. Inasmuch as magnetic forces rise asymtotically to a maximum as the air gap between two magnetically permeable magnetized members descreases to zero, such radial forces on the armature can create excessive friction forces. To prevent the air gap from going to zero, in accordance with the invention, the outer surface of the armature 100 is provided with a layer of non-magnetic material such as brass, lead or any other non-magnetic material having unity magnetic permeability, but in the preferred embodiment, a plastic such as "Teflon" (Registered Trademark of DuPont) which inherently has low friction characteristics is employed. Normally, the outside diameter of band 101 has a diameter approximately 0.008 inches less than the inner diameter of the cavity 26 to provide adequate working clearance and to enable ease of assembly of the armature in the housing cavity. The Teflon coating has a thickness at least twice the thickness of this nominal air gap, e.g. 0.0017–0.0019 inches such that even though the armature 100 is pulled into radial engagement with the inner surfaces of the cavity, there will remain an air gap in the magnetic circuit at least twice that of the minimum designed air gap. The radial pressures and thus friction are held to value which will permit moving of the armature with a minimum number of ampere turns in the solenoid S.

Surfaces 96, 102 being angled relative to the axis perpendicular further reduce the number of ampere turns required on the solenoid S. The minimum number of ampere turns required is that necessary to start the armature moving against static friction and the bias force of spring 110 at the maximum air gap 106. Once an air gap starts to decrease, the magnetic forces increase in a known manner to move the valve member to the full open position. If the surfaces were flat, i.e. perpendicular to the axis, these forces would increase on an approximate parabolic curve to asymtotically approach the maximum. By angling the surfaces, the magnetic force at maximum air gap (where it is needed) is substantially increased at a sacrifice of the maximum force at zero air gap (where it is not needed). A lesser number of ampere turns are required to move the valve member V to the open position.

By adjusting the angling of surfaces 96, 102 the force displacement curve can be appropriately controlled. An included angle of 120 degrees is preferred.

Armature 100 in effect forms a support for tube 80, which extends unsupported therefrom, i.e. cantilevered between the left hand end of the armature 100 and the valve seat 56. Tube 80 has an outer diameter and wall thickness such as to be quite flexible and bendable under light radial forces. As such, its unsupported end on which valve seat engaging surface 82 is formed is radially movable relative to armature 100. Surface is at an angle of approximately 45° to the axis. The length of the unsupported portion, the degree of flexibility and the rocking of armature 100 are such that under the 3.0 pounds spring force, valve seat engaging surface 82 can deflect radially a sufficient amount to be self-aligning with the valve seat 56.

It is believed that I am the first to have provided a self-aligning valve seat engaging surface using the flexibility of the valve member itself to permit the necessary movement.

Calculations indicate that a valve constructed in accordance with the preferred embodiment can have a maximum external diameter of ½ inch and a length of 1¾ inches. At 3,000 pounds psi, it will permit a fluid flow of ¼ gallon per minute, with a 50 psi pressure drop. With a solenoid coil S as above described, a valve can be moved to the full open position with approximately 6 watts of power. Greater volumes can be handled by increasing the diameter of inlet port and other dimensions in accordance with the principles described.

The invention has been described with reference to what may be described as a sub-miniature type hydraulic poppet valve. However, the novel features described can also be employed in valves of any dimension and the invention is not limited to such sub-miniature valves.

The invention has been described with reference to a preferred embodiment. Obviously, modifications and alterations will occur to others upon a reading and understanding of this specification. It is my intention to include all such modifications and alterations insofar as they come within the scope of the appended claims.

Having thus described my invention, I claim:

1. A fluid pressure valve comprising in combination a housing having an elongated cylindrical cavity therein; said housing being comprised of first, second and third lengths of tubing fastened in end to end relationship, one end of said first length being formed to a portion of lesser diameter and having a drilled axial opening therethrough providing a high pressure inlet port defined by a valve seat, means closing the open end of said third length, an outlet port drilled through a side of said first length spaced from said formed end, said second length being of magnetically non-permeable material, a valve member including a magnetically permeable armature slidable in said cavity and having an axially facing surface; a valve stem formed from hypodermic tubing fastened to said armature and extending therebeyond toward said inlet port, a magnetically permeable core member inside of said cavity and having an axially facing surface in spaced relationship to said armature surface, the end of said tubing being formed to a lesser diameter to form a valve seat engaging surface having a passage therethrough to the inside of said tubing, and means spaced from said passage closing the inside of said tubing.

2. The valve of claim 1 when said means is a piston slidable on the inside of said tubing and having one end exposed to the pressure in said inlet port and the other end abutting against said housing.

3. The valve of claim 2 wherein said piston has a diameter substantially equal to the diameter of said valve seat.

4. The valve of claim 3 including a spring biasing said valve member toward said valve seat.

5. Valve of claim 3 wherein said armature end surfaces are conical and have an included angle of approximately 120°.

* * * * *